March 31, 1953 E. FEARS 2,633,176
THREADED RETAINING DEVICE WITH FRICTION
REDUCING AND CAP MEANS
Filed Dec. 6, 1950

EDWARD FEARS
INVENTOR

BY *William E. Fears*

ATTORNEY

Patented Mar. 31, 1953

2,633,176

UNITED STATES PATENT OFFICE 2,633,176

THREADED RETAINING DEVICE WITH FRICTION REDUCING AND CAP MEANS

Edward Fears, Berlin, Md.

Application December 6, 1950, Serial No. 199,418

2 Claims. (Cl. 151—44)

The present invention relates generally to threaded retaining devices with friction reducing and cap means and more particularly to threaded retaining devices which are rust proof, and devoid of dust and dirt contamination during application.

Heretofore, retaining means, such as nuts applied to stud bolts on automobile wheels, rotating machinery, seagoing vessels, machinery flywheels etc. have been exposed to water splash, salt water contamination, and dirt and grit. Water splash causes the threaded devices to rust firmly in place and this has caused the retaining devices to become "frozen in position" and extremely difficult to loosen and remove. Dirt and grit contamination have "fouled" the threads and have also caused the retaining means to "freeze" and offer difficulties to removal and replacement when desired. Furthermore, in the application or threading on of the retaining means heretofore the frictional resistance of the pressure or bearing surfaces of the retaining devices have required great effort and sturdy tools to apply the threaded devices in position. For example, the threaded lug nuts which have been applied to threaded studs on automobile brake drums in order to retain the wheels in place provide great frictional resistance when an attempt is made to thread them into retaining position against the wheel surfaces upon the studs. Also, the exposed studs and lug bolts are exposed to water, dirt, and grit and become fouled or rusted and are "frozen" in retaining position. An automobile tire which receives a puncture during operation provides an exertional hazard to the operator when it is necessary to change the wheel and the punctured tire, for the lug nuts are usually "frozen" in place and are extremely difficult to remove; especially for a woman operator. Heretofore grease and oil have been applied to the exposed nuts and bolts, but during continuous operation of the machinery these lubricants are thrown off by centrifugal force and the parts are again exposed to foreign materials. Various coverings have been applied to the exposed devices but the centrifugal forces developed during the operation of most machinery causes most of the coverings to be thrown off and the threaded areas of the retaining device to be exposed. Although many attempts were made to overcome the foregoing difficulties and other disadvantages, none, as far as I am aware, was entirely successful when carried into practice commercially.

I have discovered and invented a retaining device which provides a minimum of frictional resistance when threaded into position, which is substantially water and dirt proof, and which offers a minimum of resistance when removal is attempted.

An object of the invention is to provide a threaded retaining device which may be threaded into position with a minimum of frictional resistance.

Another object of the invention is to provide a threaded retaining device which, once threaded into place, may be removed easily.

A further object of the invention is to provide a threaded retaining device which once in application will not be subject to rusting because of salt or fresh water contact, and will not be fouled because of dust or dirt contamination.

Other objects and advantages will become apparent from the following description taken in conjunction with the accompanying drawings in which.

Figure 1:
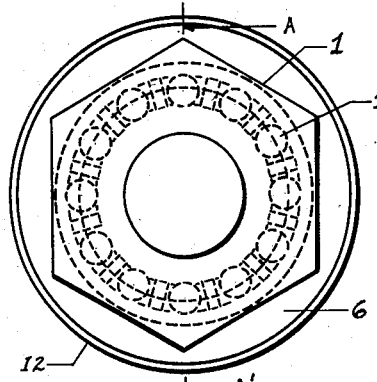
Figure 1 represents a plan view of the threaded retaining device with cylindrical cover cup removed.

In general, this threaded retaining device consists of an internally threaded member having an integral cylindrical flanged collar section substantially centrally located with respect to the center line of said internal threaded member at one end thereof, an integral cylindrical protuberance defining the end portion of said internally threaded member and defining the base of said flanged collar section, the cylindrical protuberance having an annular bearing groove therein; a cylindrical externally threaded annular bearing member having an internal opening defining the contour of said flanged collar is rotatably coupled with the flanged collar, said externally threaded portion having an inwardly circular removed portion therein defining an area wherein the integral cylindrical protuberance of the internally threaded member is rotatably mounted, said externally threaded cylindrical annular bearing member having an annular bearing groove in the base of the area defined by the inwardly circular removed portion of the externally threaded bearing member, said bearing groove coinciding with the bearing groove on the protuberance end of the internally threaded member; a cylindrical cup closed at one end having internal threads and being open at the other end, and having a set screw inwardly threaded opening with a set screw therein located substantially mid-way on the cylindrical surface of the cylindrical cup, said set screw being threaded in place against the external surface of the internally threaded member when the cup is threaded into position over the threads of the externally threaded member during retaining position of the threaded retaining device. The externally threaded bearing member and the cylindrical cup are threaded in the reverse direction from the internally threaded member so that when each is threaded into place the position will be locked by setting the set screw in the cylindrical cup against the external surface of the internally threaded member. The area defining the coinciding bearing grooves of the internally threaded member and the externally threaded bearing member has a bearing race and a set of bearings located therein. The internally threaded member and the cylindrical cup each has a gripping means thereon for threading them into their respective retaining positions.

In fully described detail 1 represents an internally threaded member (referring to the drawings) as a hexagonal nut having a cylindrical portion 2 machined on one end and an annular bearing groove 3 machined therein. The hexagonal nut has a collar 4 with a flange 5 forged thereon to couple the hexagonal nut in rotatable position with respect to the externally threaded annular bearing member 6. The member 6 has a circular opening therein with a machined surface 7 defining the external contour of collar 4 and flange 5. The hexagonal nut 1 and member 6 are so coupled together that a clearance area 8 is provided. With this provision the face of collar 4 will not bear against a surface (not shown) being retained in position, but only the face 9 of member 6 will bear against the surface being retained in position. Member 6 has a bearing groove 10 machined therein and a circular set of bearings 11 with a race (not shown) are inserted into bearing groove 3 and bearing groove 10 before hexagonal nut 1 and member 6 are coupled together by inserting collar 4 into the bearing member opening 7 and forging the flange 5 into place. In this manner hexagonal nut 1 is coupled in rotatable position with respect to bearing member 6, and is easily rotated with respect thereto because of bearings 11.

After hexagonal nut 1 is threaded into position against a surface (not shown) to be maintained in position the cylindrical cup 12 is threaded over bearing member 6 by threads 13 and internal threads 14 on the cup. A set screw 15 is provided in the side of cylindrical cup 12 passing through a threaded hole 16 in the side of the cup. The external threads 13 of bearing member 6 are reversed with respect to threads 17 of hexagonal nut 1 and stud 18.

In operating the retaining device hexagonal nut 1 is threaded onto a stud 18 or other anchoring means forcing the bearing surface 9 of bearing member 6 against a retained surface (not shown). In this manner the bearing member 6 does not rotate against the friction offered by bearing surface 9 and the surface (not shown) to be maintained in position. The only friction offered to the rotation of hexagonal nut 1 is against the bearings 11. After hexagonal nut 1 is threaded into place, cylindrical cup 12 is threaded on over threads 13 by aid of gripping means 19, e. g., hexagonal protuberances. Since threads 13 and threads 17 are in reverse direction the hexagonal nut 1 and cup 12 are secured together. To insure that cup 12 and hexagonal nut 1 are locked in place set screw 15 is threaded into position by threading point 20 against the hexagonal surface of hexagonal nut 1. This arrangement provides a threaded retaining device which offers little frictional force against being threaded into position or being removed from position. Furthermore the device provides retaining device wherein the threads are not exposed to water splash, or to dirt and dust contamination after the component parts are threaded into fixed position.

Figure 2:
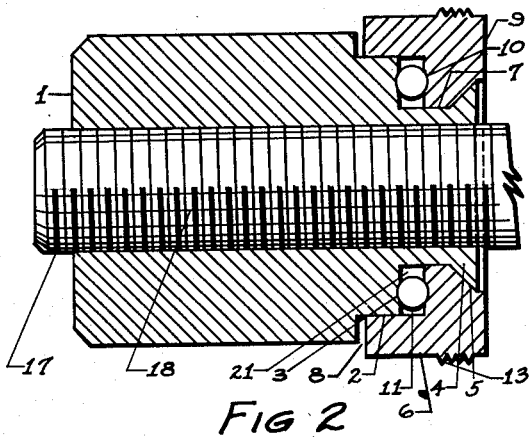
Figure 2 represents a sectional view of the threaded retaining device with cylindrical cover cup removed taken through the line A—A' of Figure 1.
Figure 3:
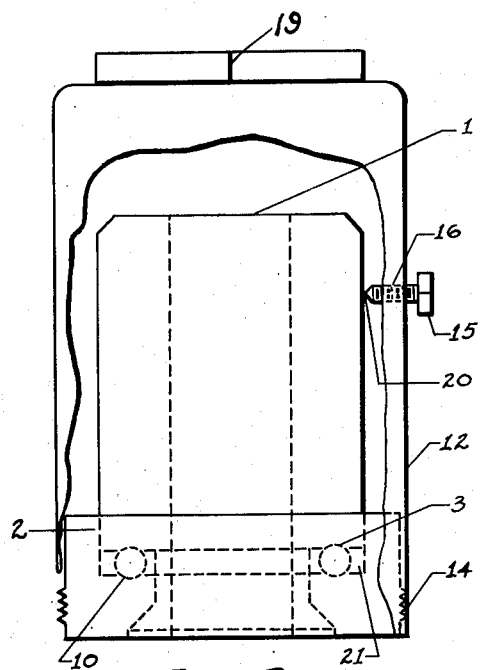
Figure 3 represents an elevation view of the complete assembly with the cylindrical cup attached but sectioned out so as to illustrate the full structure of the threaded retaining device.
Figure 4:
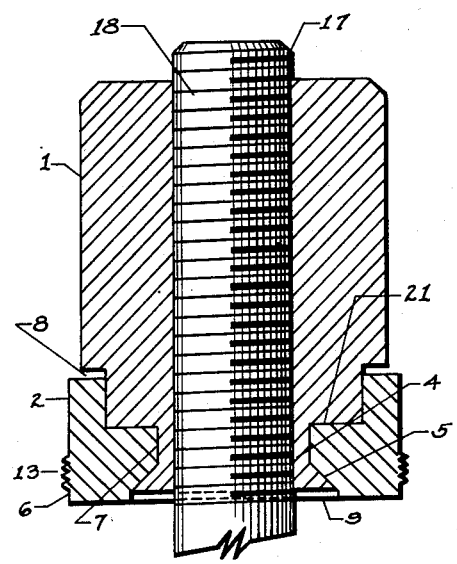
Figure 4 represents a sectional view of a modified threaded retaining device with the cover cup removed.

A modified embodiment of the invention is illustrated by Figure 4 in the drawings, wherein the structure is the same as the preferred embodiment depicted by Figures 1, 2, and 3, except the bearing grooves 3 and 10 have been omitted, and also the bearings 11. The protuberance 2 is extended to fit within the removed section as at 21 defining the contour of the protuberance 2 in bearing member 6. Against the surface 9 there is no rotational friction offered by the surface (not shown) retained in position, but only friction produced by the rotation of protuberance 2 within recess 21 when hexagonal nut 1 is threaded into place. Actually this embodiment will provide more friction against rotation than does the preferred embodiment with the bearings located therein, but protuberance 2 and area 21 can be oiled, and the oil will be retained therein against contamination by cup 12 being threaded into place. This modified embodiment of the invention offers a cost advantage in the omission of the bearing assemblies therefrom, but otherwise the same advantages are provided as provided by the preferred embodiment of the invention.

The parts of the threaded retaining device may be machined, extruded, or formed by other means known in the art of metal working. Furthermore, the annular bearing member 6 and hexagonal nut 1 may be coupled together by forging, swaging, or pressing the flange 5 on collar 4 into place against surface 7 on bearing member 6.

The device illustrated by the preferred and modified embodiments in the drawings provides a threaded retaining device which may be threaded into place with a minimum of frictional resistance, and one which may be removed with a minimum of frictional resistance. Furthermore a device is provided which will not be subject to rusting because of salt or fresh water splash reaching the threaded areas, and will be substantially free of dust and dirt contamination when the protective cup as shown hereinbefore is threaded and locked in place.

Although the present invention has been described in conjunction with a preferred and modified embodiment, it is to be understood that modifications and variations may be resorted to without departing from the spirit and scope of the invention, as those skilled in the art will readily understand. Such modifications and variations are considered to be within the purview and scope of the invention and appended claims.

I claim:

1. A ball bearing retaining device comprising a nut having internal threads, an externally threaded annular bearing member with a bearing face thereon, an internally threaded cup being threaded in opposite direction than the nut and having a set screw threaded opening in the side thereof with a set screw therein, said nut having an integral cylindrical protuberance with an annular bearing groove in the face thereof at one end and an integral collar and flange extending beyond said protuberance, said externally threaded annular bearing member having a removed portion defining the protuberance of the nut with an annular bearing groove in the area defining the collar and flange portion of the nut with an annular bearing groove in the area defining the base of said removed portion, said flange not extending beyond the bearing face of said externally threaded annular bearing member, said annular bearing groove coinciding with the bearing groove in the nut with bearings therein, said nut being rotatably coupled with the externally threaded bearing member by seating the collar and the flange of the nut within the defined opening of the annular bearing member, and substantially frictionlessly coupled therewith, said internally threaded cup being threaded over said annular bearing member and said set screw being adapted to lock against the nut in retaining position of the retaining device.

2. A threaded retaining device comprising an internally threaded member having an external gripping means thereon, an externally threaded annular bearing member having a bearing face thereon, an internally threaded cup having external gripping means thereon, said cup being threaded in reverse direction from the internally threaded member and having a set screw threaded opening in the side thereof with a set screw therein, said internally threaded member having an integral cylindrical protuberance at one end thereof and an integral cylindrical collar with a flange thereon extending beyond the cylindrical protuberance, said externally threaded member having a removed portion substantially defining said cylindrical protuberance of the internally threaded member and an opening therein substantially defining said collar and flange of the internally threaded member, said internally threaded member being substantially frictionlessly and rotatably coupled with the externally threaded annular bearing member by seating the cylindrical protuberance and the collar and flange of the internally threaded member within said defining portion and opening of the externally threaded member, said flange not extending beyond the bearing face of said externally threaded annular bearing member, and said threaded cup being threaded on over the threaded bearing member and the set screw therein being threaded against the internally threaded member and adapted to lock the cup and the internally threaded member in retaining position.

EDWARD FEARS.

REFERENCES CITED

The following references are of record in the file of this patent:

UNITED STATES PATENTS

| Number | Name | Date |
|---|---|---|
| 1,059,326 | Ackermann | Apr. 15, 1913 |
| 1,174,759 | Passmore | Mar. 7, 1916 |
| 1,541,963 | Jasper | June 16, 1925 |
| 2,080,047 | Kauffman | May 11, 1937 |
| 2,391,279 | Tarwater | Dec. 18, 1945 |

FOREIGN PATENTS

| Number | Country | Date |
|---|---|---|
| 17,508 | Great Britain | July 28, 1909 |
| 564,377 | France | Dec. 28, 1923 |
| 281,506 | Great Britain | Dec. 8, 1927 |